United States Patent
Sidorin et al.

(10) Patent No.: US 7,190,515 B2
(45) Date of Patent: Mar. 13, 2007

(54) SOLAR TELESCOPE WITH INTEGRATED ALIGNMENT MECHANISM

(75) Inventors: Yakov Sidorin, Tucson, AZ (US); David L. Lunt, deceased, late of Tucson, AZ (US); by Geraldine Hogan, legal representative, Tucson, AZ (US); Manuel B. Serrano, Tucson, AZ (US)

(73) Assignee: Coronado Instruments, Inc., Irvine, CA (US)

( * ) Notice: Subject to any disclaimer, the term of this patent is extended or adjusted under 35 U.S.C. 154(b) by 27 days.

(21) Appl. No.: 11/123,944

(22) Filed: May 5, 2005

(65) Prior Publication Data

US 2005/0248840 A1 Nov. 10, 2005

Related U.S. Application Data

(60) Provisional application No. 60/569,480, filed on May 6, 2004.

(51) Int. Cl.
*G02B 23/00* (2006.01)

(52) U.S. Cl. ........................... 359/400; 359/399

(58) Field of Classification Search ................ 359/399, 359/400, 429, 430
See application file for complete search history.

(56) References Cited

U.S. PATENT DOCUMENTS

| 249,022 | A | * | 11/1881 | Davis et al. ................. 359/400 |
| 2,173,545 | A | * | 9/1939 | Wall ............................. 33/268 |
| 4,027,943 | A | * | 6/1977 | Everett ........................ 359/399 |
| 4,437,736 | A | * | 3/1984 | Janosik, Sr. ................ 359/400 |
| 6,614,593 | B2 | * | 9/2003 | Sadler ......................... 359/430 |
| 2004/0027660 | A1 | | 2/2004 | Sadler |

* cited by examiner

*Primary Examiner*—Arnel Lavarias
(74) *Attorney, Agent, or Firm*—Antonio R. Durando

(57) ABSTRACT

A targeting unit is incorporated into the main body of a solar telescope. The targeting image is provided by an aperture facing the sun in the housing of the telescope through which sunlight is received and directed to a transmissive viewing screen placed in the housing on the same side of the telescope's eyepiece. All parts of the targeting system are fixed to the housing of the telescope and removed from accidental contact by personnel operating the telescope, thereby minimizing the chance for events that might cause misalignment. In addition, this configuration makes it possible to easily position both the viewing screen and the eyepiece on the same side of the telescope following any degree of folding of the objective beam.

15 Claims, 3 Drawing Sheets

SOLAR TELESCOPE WITH INTEGRATED ALIGNMENT MECHANISM

RELATED APPLICATIONS

This application is based on U.S. Provisional Application Ser. No. 60/569,480, filed May 06, 2004.

BACKGROUND OF THE INVENTION

1. Field of the Invention

This invention is related in general to the field of solar telescopes. In particular, it relates to a targeting system integrated within the body of a solar telescope.

2. Description of the Related Art

Solar telescopic observation requires that the objective of the telescope be precisely aligned with the sun. Because the angular size of the sun, viewed from the earth, is about 0.5°, pointing a solar telescope with a commensurate field of view precisely towards the sun is not an easy task. This difficulty is further exacerbated by the fact that the user of the telescope cannot look directly at the sun without harming his or her eyes.

Rough alignment of solar telescopes is typically achieved merely by pointing the telescope aperture in the general direction of the sun and minimizing the shade cast by the telescope. Since most telescopes have a tubular configuration, this process is rather simple to carry out. However, this type of alignment is often not sufficiently precise because of the small angles subtended by the sun. More sensitive aids for aligning solar telescopes with the sun consist of stand-alone units attached to the outer surface of the tube of the telescope. These aids operate in a fashion similar to the aiming scopes on rifles, with a small aperture projected in direct sunlight onto a viewing screen (both located in a unit mounted on the telescope's tube). When the projected sunspot is aligned with the center of the screen, the telescope is aimed at the sun. A similar pointing system is described in U.S. Patent Publication No. 2004/0027660, which includes a gnomon attached to the exterior of the telescope frame to project a shade in direct sunlight onto a viewing surface. When the telescope is aligned with the sun, the shade is eliminated, thereby enabling the targeting of the telescope towards the sun.

Thus, all currently available telescopes are either devoid or an aiming mechanism or are equipped with an external unit attached to the body of the telescope. The latter types are tubular units disposed in parallel to the tube of the telescope, so that the respective optical axes point to the same target at infinity. This configuration suffers from several problems that over time tend to affect the performance of the aiming mechanism. First, from a mechanical point of view, the exterior attachment of the aiming unit to the housing of the telescope subjects it to unavoidable bumps and other stressing forces applied by users that cause misalignment of the unit's optical axis with respect to that of the telescope. Second, from an optical point of view, these units transmit an unfolded image, which require observation in the direction of the sun during the alignment process. This is often unfortunate because the sun's brightness makes it difficult to identify and follow the image formed on the aiming unit's viewing screen. Moreover, the telescope's imaging system is often folded toward an eyepiece placed off-axis with respect to the optical axis of the objective, which implies that a user of the telescope has to switch position to use the aiming unit and the eyepiece.

Therefore, there is still a need for a telescope aiming device that overcomes the problems of prior-art units. This invention achieves these goals by integrating the targeting system and the viewing screen within the body of the solar telescope.

BRIEF SUMMARY OF THE INVENTION

The invention consists of incorporating a targeting unit into the main body of a solar telescope, such that the optical axis of the telescope and the optical axis of the targeting unit, once set to aim at the same point at infinity, cannot become misaligned simply as a result of usage and related wear and tear. Therefore, the image used to aim the telescope, the screen used to view the image, and the optics used to relay the targeting beam are all incorporated into the housing of the telescope components.

According to one aspect of the invention, the targeting image is simply provided by an aperture facing the sun in the housing of the telescope through which sunlight is received and directed to a transmissive viewing screen preferably placed in the housing on the same side of the telescope's eyepiece. Thus, all parts of the targeting system are fixed to the housing of the telescope and removed from accidental contact by personnel operating the telescope, thereby minimizing the chance for events that might cause misalignment. In addition, this configuration makes it possible to use both the viewing screen and the eyepiece without changing position with respect to the telescope.

According to another aspect of the invention, the relaying optics of the aiming unit inside the telescope housing make it possible to easily fold the targeting beam in any desirable direction. Therefore, when the eyepiece of the telescope is set to the side of the objective's optical axis, as is often the case for the user's comfort, the targeting beam can also be easily folded and directed toward a screen adjacent to the eyepiece. Moreover, since in these cases the telescope housing has necessarily been modified to accommodate the optics required to fold the objective beam toward the eyepiece, the same housing space can be used advantageously to also fold the targeting beam.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

This invention evolved from a need to provide a targeting mechanism for solar telescopes that is not subject to the lack of precision and/or the susceptibility to misalignment found in prior-art solutions. In essence, these shortcomings are corrected by integrating the targeting system within the housing of the telescope. Various embodiments provide different additional advantages that may be of particular interest for specific applications.

As used herein, the terms "housing" and "frame" are used interchangeably with reference to telescopes to refer to the outer structural shell that houses the objective, eyepiece and internal optics of a telescope. Conventional housings are typically cylindrical tubes, often of telescopic construction, but no particular shape is intended to be inferred by these terms. In particular, the housings of the present invention are expected to take different shapes depending on the placement of the viewing screen. The term "viewing screen" is intended to refer to any optical device used to view a light beam impinging on it.

Figure 1:
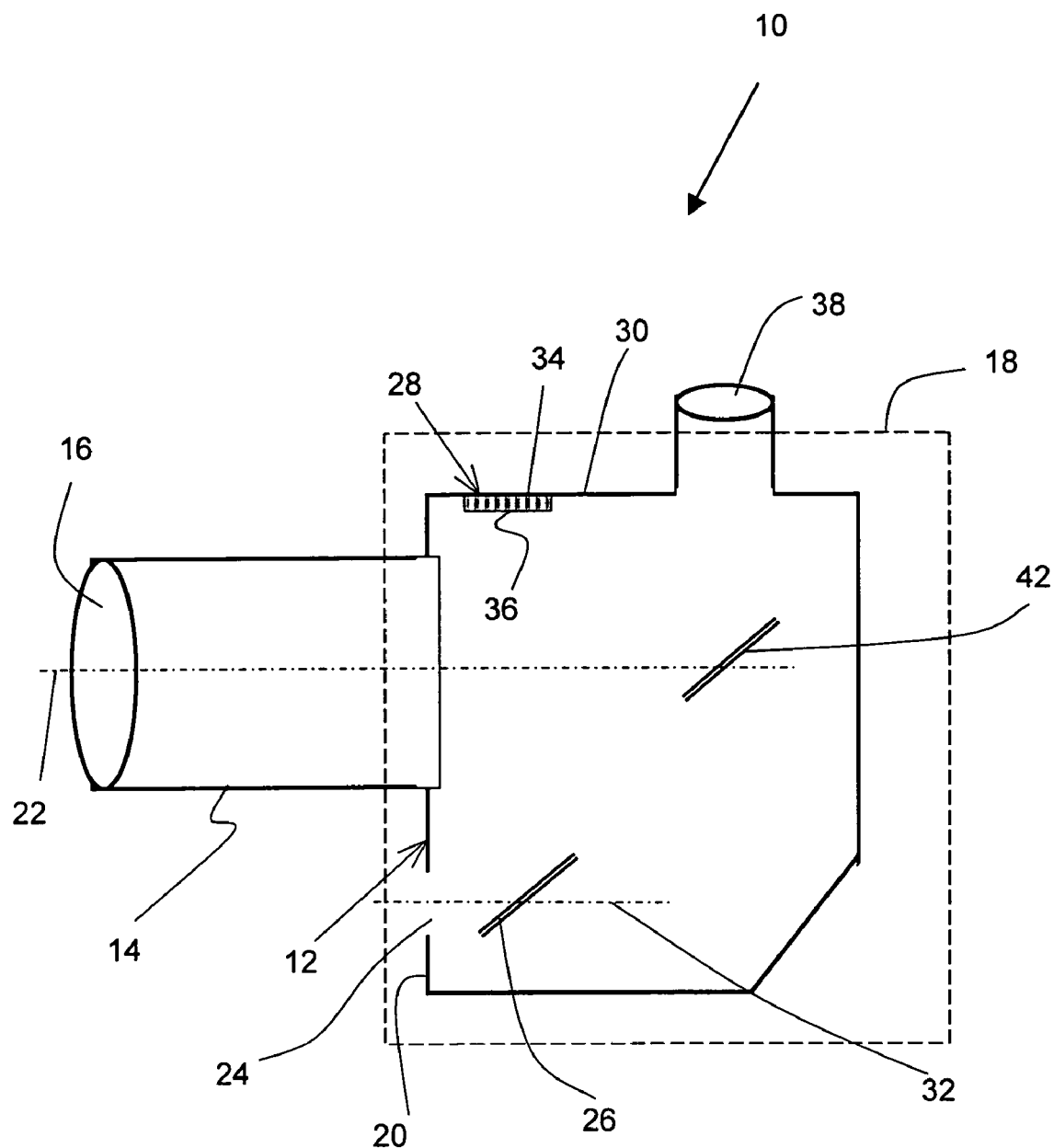
FIG. 1 is a schematic illustration of a solar telescope with a targeting system integrated within the housing of the telescope according to the invention.

A solar telescope that includes the aiming system of the invention includes an objective, an eyepiece, and a targeting unit integrated within the interior of the telescopic frame. The targeting unit comprises an input aperture, a viewing screen operating in transmission, and possibly a set of optical components integrated within the body of the telescope. Referring to the figures, wherein the same reference numerals and symbols are used throughout to refer to like parts, FIG. 1 is a schematic representation of a solar telescope 10 wherein the housing 12 consists of two main parts, a cylindrical tube 14 (containing the objective 16 and its optics) and a preferably integral compartment 18 of generic shape (shown as prismatoid in the figure) having a front surface 20 preferably flat and oriented perpendicularly to the optical axis 22 of the objective. The aligning system consists of a small input aperture 24 in the surface 20, a relaying optical component 26 (a folding reflector in this embodiment), and a viewing screen 28 appropriately positioned and integrated with another surface 30 of the housing 12 chosen for comfortable viewing. All components of the targeting system are fixed and integral with the interior of the prismatoid body 18.

A prismatoid shape is defined as a polyhedron having two polygons in parallel planes as bases and triangular or trapezoidal lateral faces with one side lying in one base and the opposite polyhedron vertex or side lying in the other base. Examples of a prismatoid structure include the cube, rectangular parallelepiped, prism, and pyramid. One purpose of having at least a part of the telescope enclosure as a prismatoid is to allow the integration of the aligning system at any predetermined distance away from the objective lens, which generally allows for cost-effective and mass-producible implementation of the solar telescope. Another purpose is to provide a space for appropriately reducing the overall size of the telescope by folding the optical path. Another purpose is also to provide outer surfaces that facilitate mounting of the telescope on telescopic supports.

Figure 2:
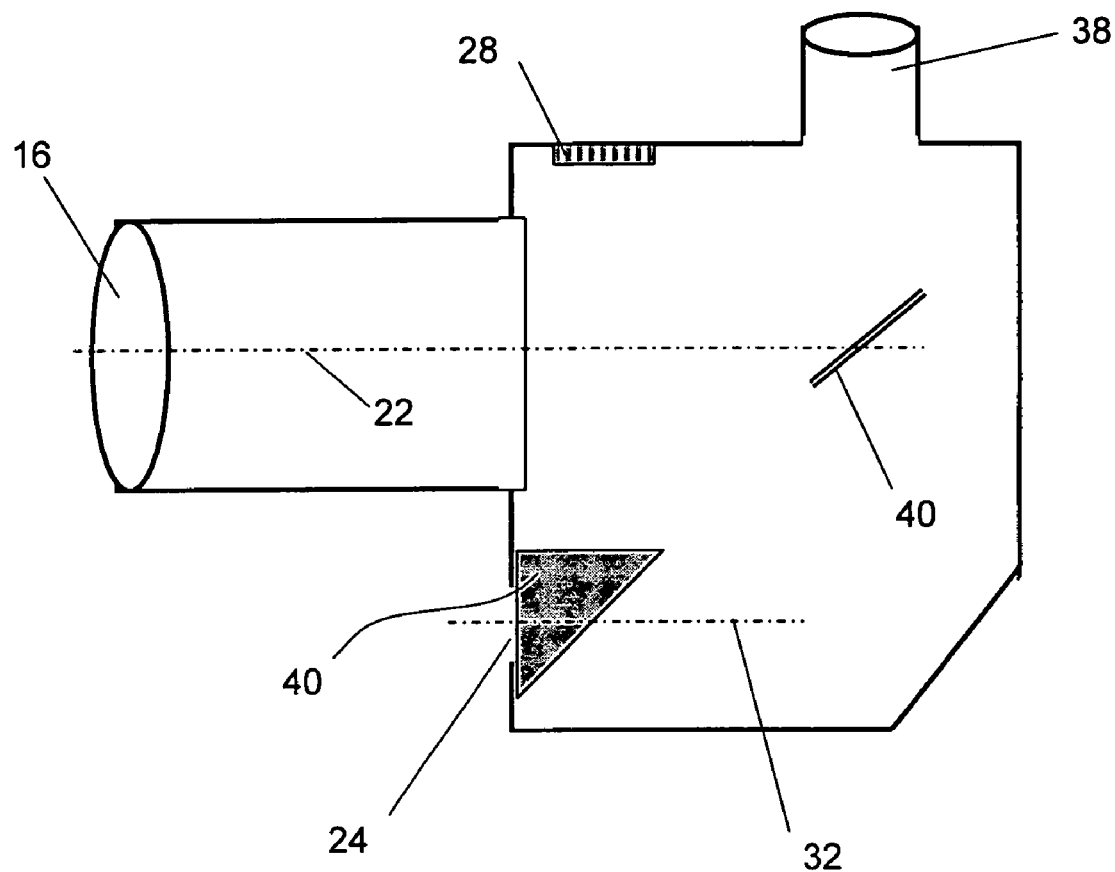
FIG. 2 is a schematic representation of another embodiment of the invention using a right-angle prism to fold the targeting beam.

Referring back to FIG. 1, the optical axis 32 of the input aperture 24 of the targeting system is parallel to the optical axis 22 of the objective 16. In cross-section, the aperture 24 can be of any regular shape, such as a simple pinhole, a circular opening, or a rectangular slit. The viewing screen 28 operates in transmission, thus the image of the input aperture formed on this screen is observed from outside of the body. In its simplest form, the viewing screen 28 is made from a plane-parallel plate of glass with a ground surface 34 and a polished surface 36. The surface 30 of the prismatoid compartment 18 containing the viewing screen 28 is preferably the same where the eyepiece 38 of the telescope is mounted (in FIG. 1, the upper surface of the compartment 18) in order to simplify the use of the integrated aligning system. The folding reflector may be a simple reflecting mirror 26, or it may be an optical prism 40 (as illustrated in FIG. 2), or any other optical element capable of delivering the light from the input aperture 24 to the viewing screen 28.

Figure 3:
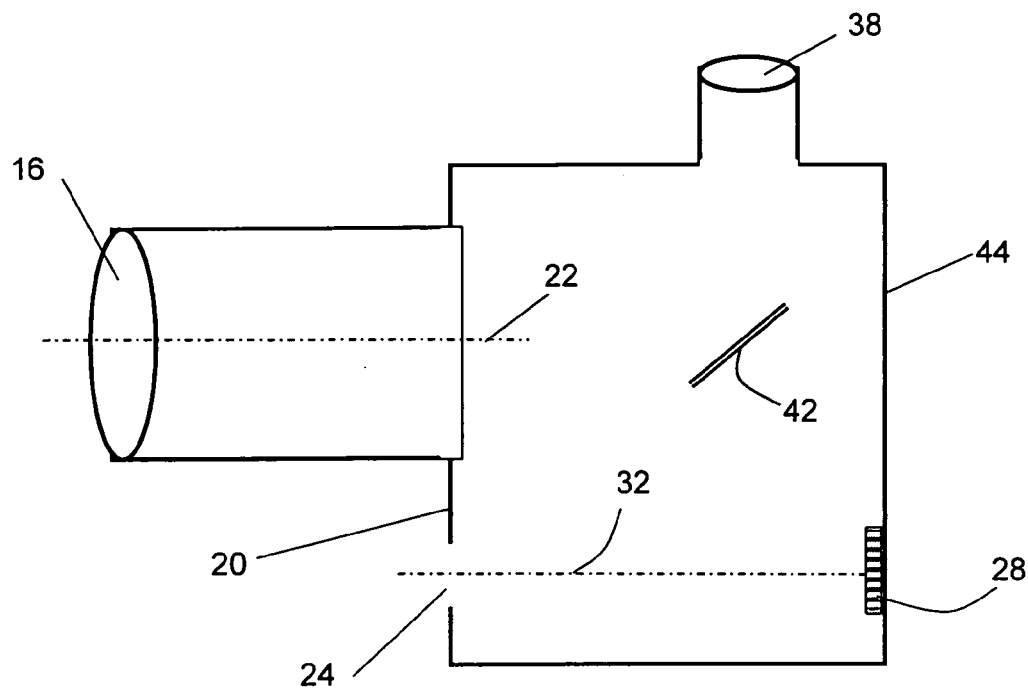
FIG. 3 illustrates still another embodiment of the invention showing an unfolded targeting beam.

The optical system of the telescope of FIG. 1 is employing a reflector 42 that folds the optical path from the objective 16 to the eyepiece 38. In general, the reflector 42 may be any optical component serving the purpose of folding the optical path within the telescopic body. It is understood, however, that this folding is not necessary for the proper operation of either the solar telescope or the aligning system of the invention, and that the optical path of either may be unfolded. It is also understood that the viewing screen 28 may be integrated with any surface of the housing 12 and that, therefore, in some arrangements there would be no need for the folding reflector 26. Such an embodiment in shown in FIG. 3, where the light from the input aperture 24 in delivered directly to a viewing screen 28 positioned on the back surface 44 opposite to the front surface 20 of the prismatoid compartment 18. The dimensions of the input aperture 24 and the viewing screen 28, as well as the optical distance between the input aperture and the viewing screen, are preferably chosen so as to provide the necessary shift of the aperture's image to localize it in the center of the screen when the telescope 10 is pointed directly toward the sun and to the edge of the screen when the telescope is pointed toward the edge of the sun's disk. The screen 28 is preferably marked with a central target marker corresponding to the image of the aperture 24.

Figure 4:
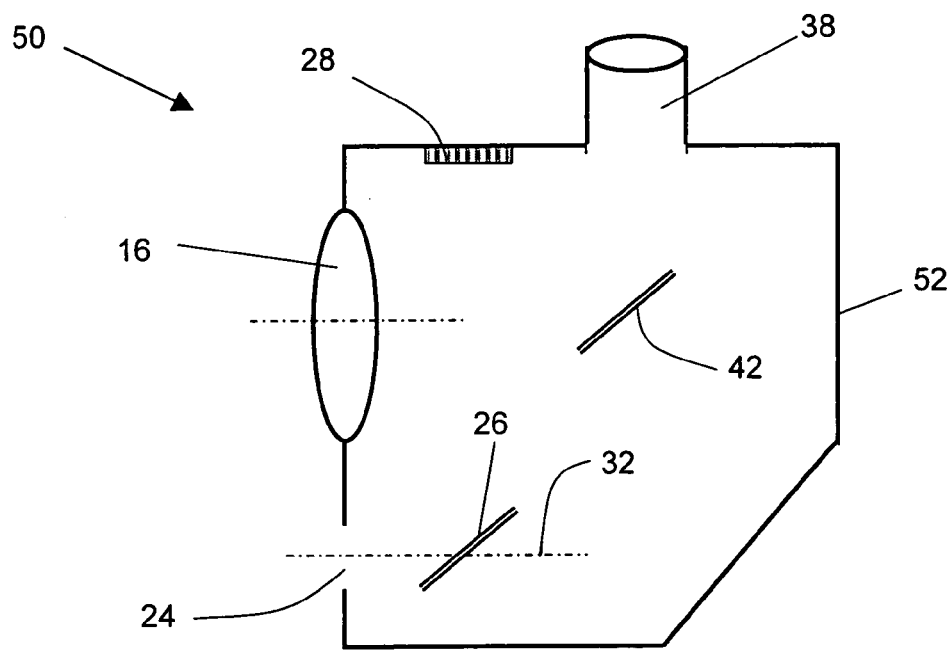
FIG. 4 is a schematic illustration of the invention wherein the housing of the telescope consists of a prismatoid structure.

FIG. 4 illustrates another solar telescope 50 with an integrated alignment system according to the invention. The housing 52 of the solar telescope 50 consists entirely of a prismatoid body (rectangular parallelepiped). This design illustrates a compact implementation of a folded telescope that incorporates a similarly folded targeting system. Because of its many flat exterior surfaces, the telescope 50 can be easily adapted for mounting on various support frames. The user can handily look at the viewing screen 28 for alignment and the eyepiece 38 for observation without changing position, all the time using a line of sight that is not impaired by the brightness of the sun.

Thus, a solar telescope has been described that incorporates a targeting unit within its housing. The invention has been shown and described with respect to certain preferred embodiments and features, but it is understood that the scope of the invention is intended to encompass other embodiments which, although not described, may be or become obvious to those skilled in the art. For example, the viewing screen could consist of an internal opaque screen viewed with a separate eyepiece. The viewing screen also does not have to be mounted directly in an opening in the housing of the telescope. It could provide the same function mounted on a fixed support frame in the interior of the housing, so long as visible from the outside. Similarly, the aperture 24 may consist simply of a hole in the housing 12, or it could be a separate aperture in a frame mounted directly on the housing or fixedly inside the housing in alignment with a hole in the housing.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. In a solar telescope, a targeting system comprising:
   an aperture in a housing of the telescope, said aperture defining a targeting optical axis parallel to an optical axis of an objective of the telescope; and
   a viewing screen affixed to said housing and aligned with said targeting optical axis, such that the viewing screen is illuminated directly by sunlight when the optical axis of the objective of the telescope is directed toward the sun;
   wherein said viewing screen is mounted on an opening in the housing of the telescope.

2. The targeting system of claim 1, wherein said aperture is a pinhole in the housing of the telescope.

3. The targeting system of claim 1, wherein said aperture is a pinhole in a front surface of the housing, and said viewing screen is mounted on an opposite surface of the housing of the telescope.

4. The targeting system of claim 1, wherein said housing includes a prismatoid portion.

5. The targeting system of claim 1, further including folding optics to direct said targeting optical axis from the aperture to the viewing screen, and wherein said viewing screen is a plane-parallel plate with a polished surface and a ground surface and said housing includes a prismatoid portion.

6. In a solar telescope, a targeting system comprising:
   an aperture in a housing of the telescope, said aperture defining a targeting optical axis parallel to an optical axis of an objective of the telescope;
   a viewing screen affixed to said housing and aligned with said targeting optical axis, such that the viewing screen is illuminated directly by sunlight when the optical axis of the objective of the telescope is directed toward the sun; and
   folding optics to direct said targeting optical axis from the aperture to the viewing screen;
   wherein said viewing screen is mounted on an opening in the housing of the telescope.

7. The targeting system of claim 6, wherein said aperture is a pinhole in the housing of the telescope, and said viewing screen is a plane-parallel plate with a polished surface and a ground surface.

8. A solar telescope comprising:
   a housing;
   an objective mounted on the housing;
   an eyepiece mounted on the housing;
   an aperture in the housing, said aperture defining a targeting optical axis parallel to an optical aids of the objective; and
   a viewing screen affixed to the housing and aligned with said targeting optical axis, such that the viewing screen is illuminated directly by sunlight when the optical axis of the objective is directed toward the sun;
   wherein said viewing screen is mounted on an opening in the housing of the telescope.

9. The telescope of claim 8, further including folding optics to direct said targeting optical axis from the aperture to the viewing screen.

10. The telescope of claim 8, wherein said aperture is a pinhole in the housing of the telescope.

11. The telescope of claim 8, wherein said aperture is a pinhole in a front surface of the housing, and said viewing screen is mounted on an opposite surface of the housing of the telescope.

12. The telescope of claim 8, wherein said housing includes a prismatoid portion.

13. The telescope of claim 8, further including folding optics to direct said targeting optical axis from the aperture to the viewing screen, and wherein said viewing screen is a plane-parallel plate with a polished surface and a ground surface, and said housing includes a prismatoid portion.

14. A solar telescope comprising:
   a housing;
   an objective mounted on the housing;
   an eyepiece mounted on the housing:
   an aperture in the housing, said aperture defining a targeting optical axis parallel to an optical axis of the objective;
   a viewing screen affixed to the housing and aligned with said targeting optical axis, such that the viewing screen is illuminated directly by sunlight when the optical axis of the objective is directed toward the sun; and
   folding optics to direct said targeting optical axis from the aperture to the viewing screen;
   wherein said folding optics is adapted to fold the targeting optical axis substantially parallel to an optical axis of the eyepiece, and said viewing screen is mounted on an opening in the housing of the telescope.

15. The telescope of claim 14, wherein said aperture is a pinhole in the housing of the telescope, and said viewing screen is a plane-parallel plate with a polished surface and a ground surface.

* * * * *